358-86. XR 3,431,351 SR

March 4, 1969 E. SENNHENN 3,431,351

METHOD OF TRANSMITTING TELEVISION SIGNALS

Filed Dec. 3, 1965

Inventor
Emil Sennhenn
by
Attorney 3,431,351

METHOD OF TRANSMITTING TELEVISION SIGNALS

Emil Sennhenn, Darmstadt-Arheilgen, Germany, assignor to Fernseh G.m.b.H., Darmstadt, Germany Filed Dec. 3, 1965, Ser. No. 511,526
U.S. Cl. 178—5.2 4 Claims
Int. Cl. H04n 1/46, 9/00, 1/00

ABSTRACT OF THE DISCLOSURE

Automatic frequency characteristic correction for a video transmission path using a direct current signal in a different path in the same medium. The direct current signal is equally affected with the video signal, and is used to correct the characteristics of the video transmission path.

*Background of the invention*

The invention concerns a method of transmitting television signals by means of transmission lines which cause a change of the overall frequency transmission characteristics of these television signals. By "transmission lines" are to be understood land cables, or radio links, and also transfer lines which are formed by optionally includable circuit elements or links, if these cause a change of the characteristics of the signals transmitted thereby. The term "television signals" signifies video signals of the kind used to transmit monochromatic or colour television.

*Summary of the invention*

The present invention comprises a method of transmitting television signals via a transmission line with frequency-dependent and/or variable amplification, in which a check signal is continuously transmitted, and from which a control voltage is derived in dependence upon the length of the said line, the said control voltage varying the frequency response and/or amplification of a transmission network such that variations in the frequency response or the level of received signals are automatically compensated.

A method in accordance with the invention has the advantage that it is not necessary to compensate for cable transfer lines of varying length by manual adjustments to frequency or amplitude compensating means. This advantage is of importance more especially when outside shots are concerned, when only a short time may be available for bringing the television camera into service. This advantage is also important in the field of industrial television; here the television installation is mainly operated by personnel which normally have different tasks and are not particularly skilled in operating the installation. A further advantage of the method in accordance with the invention is seen in that variable frequency characteristics are continuously adjusted.

The check signal may be direct current, or alternating or pulsed current may be used, the control voltage being derived either from the amplitude of the current or the shape of the wave form.

*Brief description of the drawings*

Reference should now be made to the accompanying drawings, identical switching elements shown in the figures being given the same reference numeral.

*Description of the preferred embodiments*

Figures 1, 2:
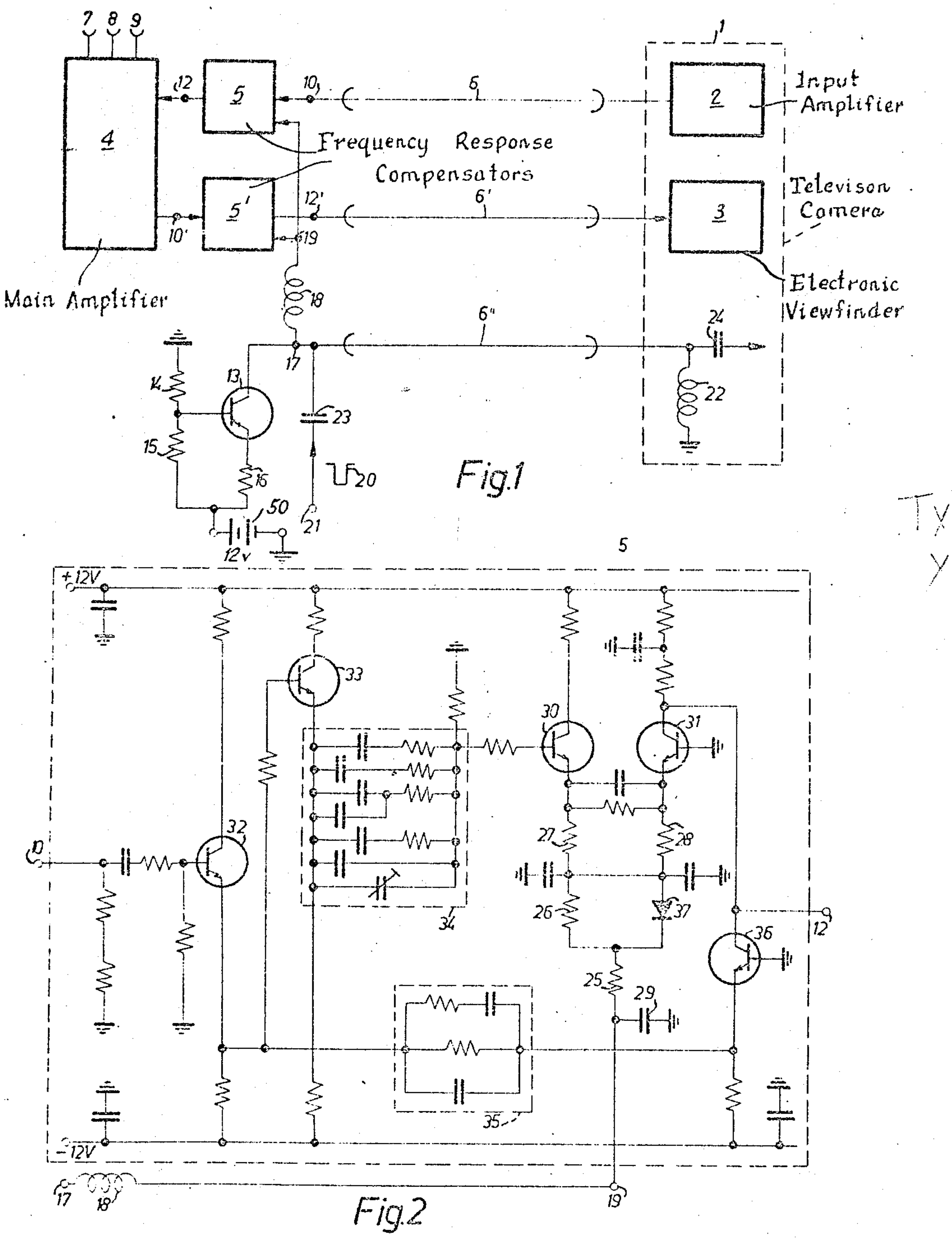
FIG. 1 shows a television installation, wherein automatic frequency correction measure is incorporated.
FIG. 2 shows a frequency response compensator.

The television installation according to FIG. 1 consists of a television camera 1 with an input amplifier 2 and an electronic viewfinder 3, a main amplifier 4, frequency response compensators 5, 5′, wires 6, 6′, 6″ in the camera cable, and components to provide a control voltage.

When the camera is in use, a video signal is fed via the wire 6 of the camera cable and the frequency response compensator 5 to the main amplifier 4. This frequency response compensator 5 is so controlled by means of a control voltage that a straight line frequency response is automatically obtained. By straight line frequency response is meant that the output signal of this particular device contains all the frequencies emitted by the camera at the other end of the transmission line, in their correct relative amplitudes. In the main amplifier 4 the television signal is beam suppressed and provided with synchronising signals, so that television signals are transmitted via terminals 7, 8, 9 and 10 which are composed of a video signal portion, beam suppression signal portions and synchronising signal portions.

The television signal transmitted via terminal 10′ is fed via the frequency response compensator 5′, terminal 12′, and the wire 6′ to the electronic view finder 3. This frequency response compensator 5′ is so controlled by means of a control voltage that a straight-line frequency response is automatically obtained.

A direct current, supplied by a D.C. power source 50, is transmitted as control signal via the wire 6″, the value of which current is determined by the transistor 13 and resistances 14, 15, 16. The voltage drop in the wire 6″ is dependent upon the length of this wire, so that at the terminal 17 a control voltage is available which is dependent upon the length of this wire 6″. This control voltage is fed via the inductance coil 18 and terminal 19 to the frequency response compensators 5 and 5′. In addition to the direct current signal a sequence of line frequency rectangular impulses 20 are transmitted via the wire 6″, from the terminal 21. The separation of the two components (direct current-line impluses) transmitted via the wire 6″ is effected by the inductance coils 18 and 22 and the condensers 23 and 24. The direct current signal mentioned above can of course pass through the inductances 18 and 22, but not through the capacitors 23 and 24. On the other hand, the line synchronizing signals 20 derived from terminal 21 readily pass through capacitors 23 and 24 to the camera, but do not pass through the inductances 18 to 22 which offer high impedance to this particular signal. The line synchronizing signals are generated at the main amplifier position, and are fed to the television camera in order to synchronize the line sweep thereof.

If a colour camera is used as television camera 1, by means of which three colour separation signals are obtained and fed via a core of the camera cable each to a colour value signal frequency response compensator and each to a main amplifier, then these three colour separation signal frequency response compensators may be controlled with the same control voltage used to obtain a linear frequency response.

The circuit arrangement of FIG. 2 shows details of the frequency response compensator 5 according to FIG. 1. The control voltage is fed via terminal 17, choke 18, terminal 19 and the resistances 25, 26, 27, 28 to the transistors 30, 31 to control their amplification. The alternating voltage component (caused by the line frequency impulses 20 of FIG. 1) is filtered out by the choke 18 and the condenser 29.

The television signal is fed to the terminal 10 and transistor 32, the frequency amplitude characteristic of which signal is to be linearised. This television signal is transmitted via the transistor 33, frequency correcting network 34 and transistors 30, 31, and also via the coupling network 35 to terminal 12 via transistor 36, where the two signals are added. Depending upon the length of the cable to be compensated the amplification of the transistors 30, 31 is increased or reduced. The amplification to control voltage ratio is adjusted by the resistance 26 and diode 37.

The frequency response compensator 5' is built in the same manner as the frequency response compensator 5. The terminals 10, 12 correspond to the connecting points 10', 12'. By means of the frequency response compensator 5', the frequency characteristics of the television signal which is fed from the main amplifier 4 (FIG. 1) via terminal 10', the frequency response compensator 5' and terminal 12, 12' to the electronic view finder 3, is also corrected.

Although a direct current has been described for use as the check signal it should be understood that an alternating current, which may be rectified for control purposes, may be employed.

I claim:

1. A method of transmitting television signals via a transmission path having variable transmission characteristics, comprising the steps of passing said signals over said path and through a frequency response compensator, continuously producing a check signal of constant characteristics, continuously passing said signal over a similar parallel path, deriving a control voltage varying in dependence on the characteristics of said similar path, and applying said voltage to said frequency response compensator to control the output thereof, in which signals from a television camera are transmitted over a cable to a first frequency response compensator, the output of which is connected to a main amplifier; that an output from said main amplifier is returned to an electronic viewfinder at said television camera location via a second frequency response compensator; and that said two frequency response compensators are both connected to and varied by said control voltage.

2. A method as recited in claim 1, in which said control voltage varies the amplification characteristics of said frequency response compensator.

3. A method as recited in claim 1, in which said check signal and said voltage are of constant polarity.

4. A method as recited in claim 1, in which the television signals are transmitted over wires in a cable, said check signal being transmitted over a separate wire in said cable.

References Cited

UNITED STATES PATENTS

| | | | |
|---|---|---|---|
| 2,535,711 | 12/1950 | Wiggin | 178—7.2 |
| 2,649,501 | 8/1953 | Cope. | |
| 3,055,974 | 9/1962 | Martinez | 178—7.1 |
| 3,165,585 | 1/1965 | James | 178—69.5 |
| 3,283,063 | 11/1966 | Kawashima | 325—65 XR |

ROBERT L. GRIFFIN, *Primary Examiner.*

CARL R. VONHELLENS, *Assistant Examiner.*

U.S. Cl. X.R.

178—69.5